United States Patent [19]
Mallett et al.

[11] 3,895,342
[45] July 15, 1975

[54] DIGITAL FIELD COMPOSITING SYSTEM
[75] Inventors: A. J. Mallett; Jerrell F. Moffitt, both of Houston, Tex.
[73] Assignee: Geo Space Corporation, Houston, Tex.
[22] Filed: Oct. 16, 1968
[21] Appl. No.: 767,951

[52] U.S. Cl. ........ 340/15.5 CP; 340/15.5 DP; 444/1
[51] Int. Cl. ............................................. G01v 1/28
[58] Field of Search ............ 340/15.5 DP, 15.5 CP; 444/1

[56] References Cited
UNITED STATES PATENTS
3,437,991 4/1969 Porter ............................... 340/15.5
3,466,596 9/1969 Siems et al. ....................... 340/15.5

Primary Examiner—Maynard R. Wilbur
Assistant Examiner—N. Moskowitz
Attorney, Agent, or Firm—Michael P. Breston

[57] ABSTRACT

This invention relates to the processing of electrical signals and to an improved method and apparatus for combining or compositing in the field electric signals derived from a seismic exploration system, thereby obtaining a reduction in the cost of processing digital tapes by office computers as well as providing to the geologist in the field on-the-spot information useful to better guide the progress of the exploration crews. Each sample of raw data may be selectively eliminated from or added to the results of the compositing process.

2 Claims, 6 Drawing Figures

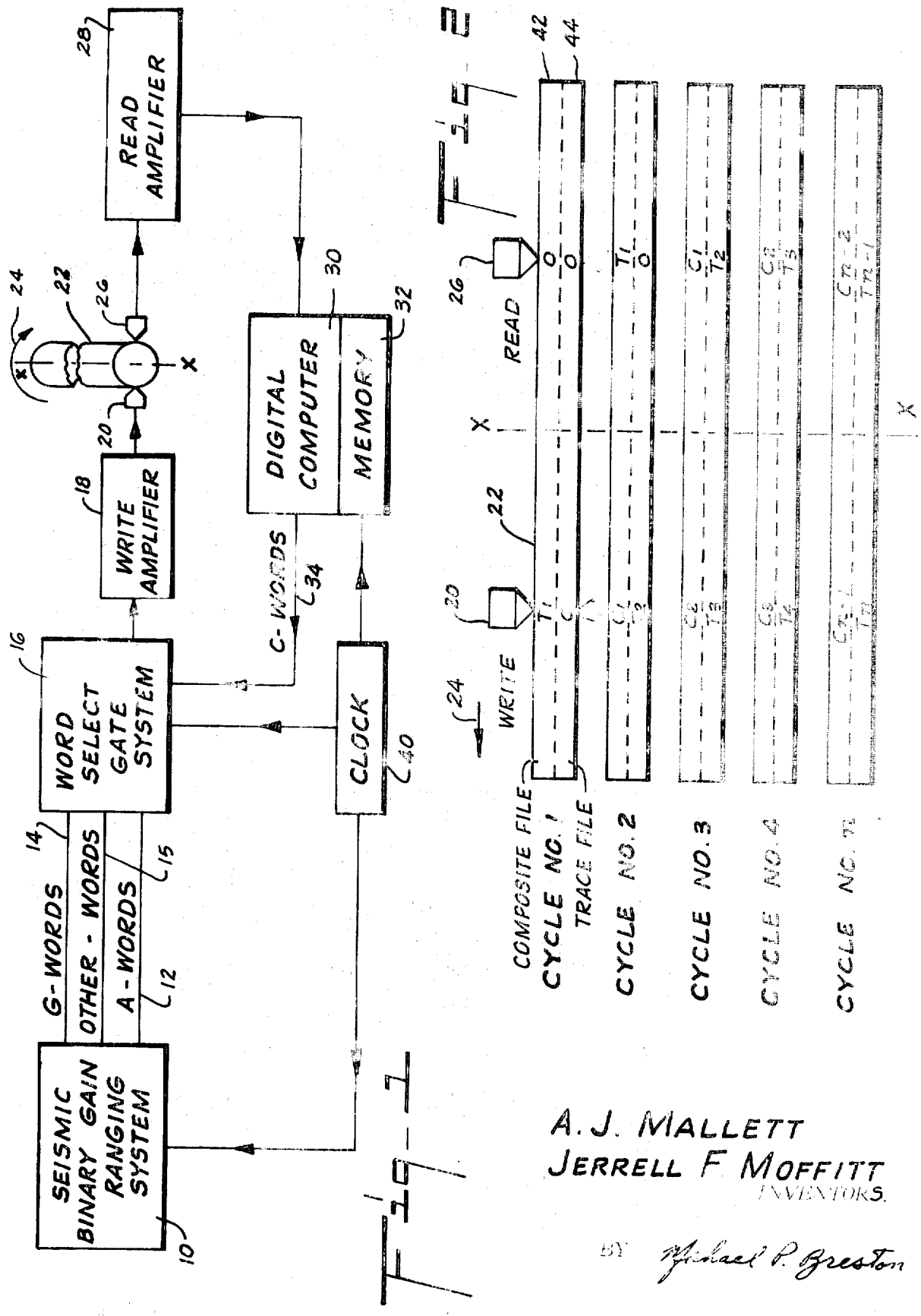

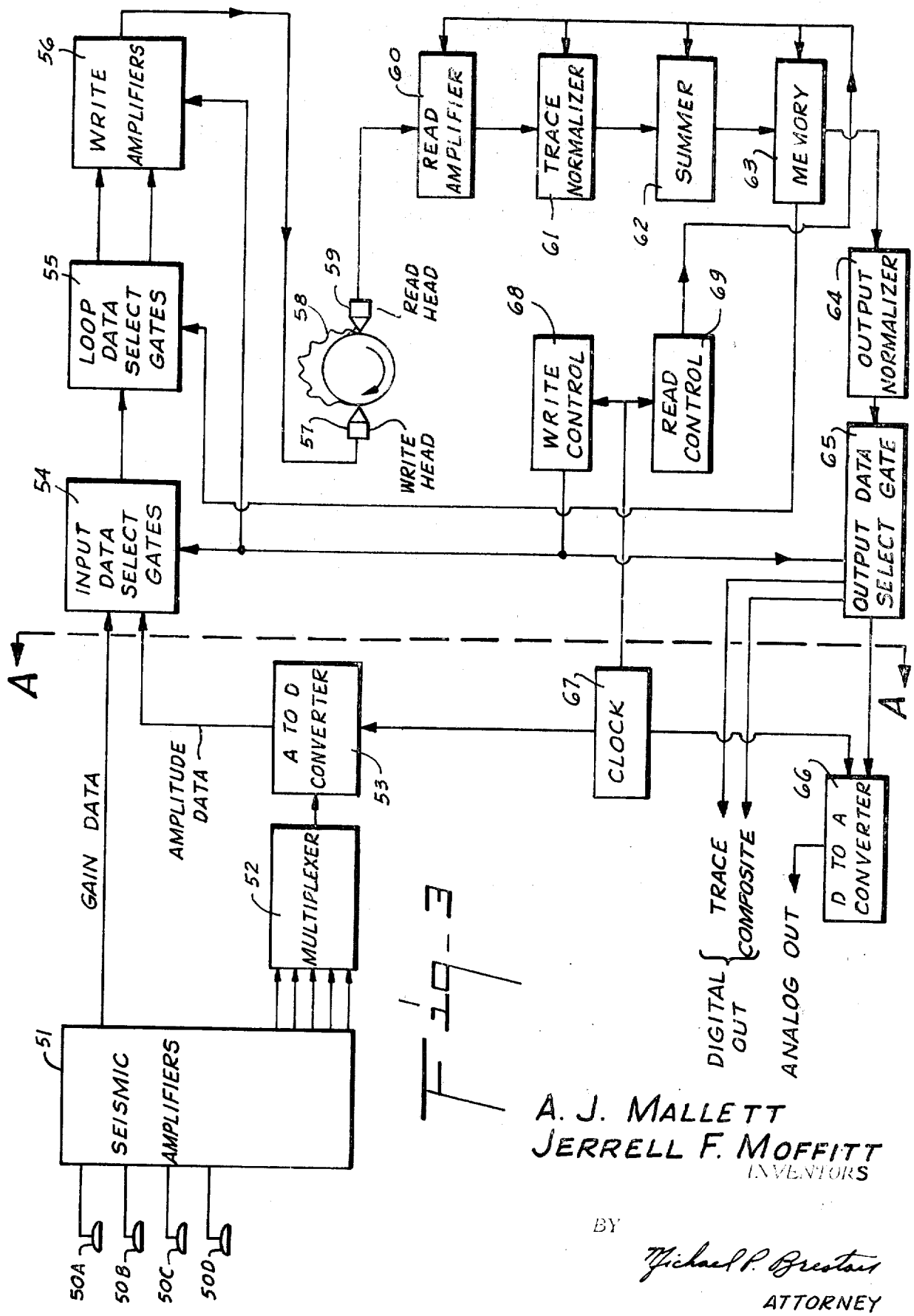

| Track No. | | | | | | | | | | | | |
|---|---|---|---|---|---|---|---|---|---|---|---|---|
| 1 | K18 | K48 | CN18 | CN22 | OVF7 | SR1 | OVF7 | SR1 | OV | OVF7 | 0 | OVF7 | 0 |
| 2 | K14 | K44 | CN14 | CN21 | OVF6 | SR2 | OVF6 | SR2 | OV | OVF6 | 0 | OVF6 | 0 |
| 3 | K12 | K42 | CN12 | CN38 | OVF5 | SR3 | OVF5 | SR3 | OV | OVF5 | 0 | OVF5 | 0 |
| 4 | K11 | K41 | CN11 | CN34 | OVF4 | OVF2 | OVF4 | OVF2 | OVF | OVF4 | OVF2 | OVF4 | OVF2 |
| 5 | K28 | K58 | CN28 | CN32 | OVF3 | OVF1 | OVF3 | OVF1 | OVF | OVF3 | OVF1 | OVF3 | OVF1 |
| 6 | K24 | K54 | CN24 | CN31 | CEX8 | CEX2 | CEX8 | CEX2 | CEX8 | 0 | 0 | 0 | 0 |
| 7 | K22 | K52 | NGB1 | 0 | CEX4 | CEX1 | CEX4 | CEX1 | CEX4 | 0 | 0 | 0 | 0 |
| 8 | 1 | 1 | 1 | 1 | 1 | 1 | 1 | 1 | 1 | 1 | 1 | 1 | 1 |
| 9 | K21 | K51 | NGB2 | U | CSB | CD8 | CSB | CD8 | CSB | B | CD8 | CSB | CD8 |
| 10 | K38 | K68 | NGB4 | 0 | CD1 | CD9 | CD1 | CD9 | CD1 | 1 | CD9 | CD1 | CD9 |
| 11 | K34 | K64 | NGB8 | 0 | CD2 | CD10 | CD2 | CD10 | CD2 | 2 | CD10 | CD2 | CD10 |
| 12 | K32 | K62 | K78 | Z | CD3 | CD11 | CD3 | CD11 | CD3 | | CD11 | CD3 | CD11 |
| 13 | K31 | K61 | K74 | SMG8 | CD4 | CD12 | CD4 | CD12 | CD4 | | CD12 | CD4 | CD12 |
| 14 | 0 | 0 | K72 | SMG4 | CD5 | CD13 | CD5 | CD13 | CD5 | | CD13 | CD5 | CD13 |
| 15 | 0 | 0 | K71 | SMG2 | CD6 | CD14 | CD6 | CD14 | CD6 | | CD14 | CD6 | CD14 |
| 16 | 0 | 0 | 0 | SMG1 | CD7 | G | CD7 | G | CD7 | G | 0 | CD7 | 0 |
| 17 | P | P | P | P | P | P | P | P | P | P | P | P | P |
| 18 | 0 | 0 | 0 | 0 | TEX8 | TEX2 | TEX8 | TEX2 | TEX8 | TEX2 | 0 | 0 | 0 |
| 19 | 0 | 0 | 0 | 0 | TEX4 | TEX1 | TEX4 | TEX1 | TEX4 | TEX1 | 0 | 0 | 0 |
| 20 | 1 | 1 | 1 | 1 | 1 | 1 | 1 | 1 | 1 | 1 | 1 | 1 | 1 |
| 21 | 1 | 1 | 1 | U | TSB | TD8 | TSB | TD8 | TSB | TD8 | D8 | TSB | TD8 |
| 22 | 1 | 1 | 1 | 0 | TD1 | TD9 | TD1 | TD9 | TD1 | TD9 | D9 | TD1 | TD9 |
| 23 | 1 | 1 | 1 | 0 | TD2 | TD10 | TD2 | TD10 | TD2 | TD10 | 10 | TD2 | TD10 |
| 24 | 1 | 1 | 1 | SMG4 | TD3 | TD11 | TD3 | TD11 | TD3 | TD11 | 11 | TD3 | TD11 |
| 25 | 1 | 1 | 1 | SMG3 | TD4 | TD12 | TD4 | TD12 | TD4 | TD12 | 12 | TD4 | TD12 |
| 26 | 1 | 1 | 1 | SMG2 | TD5 | TD13 | TD5 | TD13 | TD5 | TD13 | 13 | TD5 | TD13 |
| 27 | 1 | 1 | 1 | SMG1 | TD6 | TD14 | TD6 | TD14 | TD6 | TD14 | 14 | TD6 | TD14 |
| 28 | 1 | 1 | 1 | SMG0 | TD7 | G | TD7 | G | TD7 | G | TD | TD7 | 0 |

Tracks 1–16: COMPOSITE, CLOCK; Track 17: PARITY; Tracks 18–28: CLOCK, TRACE

SYNC TIME | CH. 1 | CH. 2 | CH. 3 | CH. 30

Kmn - CONSTANTS, 7 BCD CODED DIGITS, OPT.
CN - CYCLE NUMBER COUNT, 3 BCD DIGITS
NGB - NORMALIZER GAIN CODE
SMG - SUB-MULTIPLEX GAIN CODE
CEX - COMPOSITE EXPONENT
TEX - TRACE EXPONENT
U - UP GAIN CHANGE INDICATOR
OVF - OVERFLOW BIT POSITIONS
SR - RIGHT SHIFT POSITIONS
G - CHAN. GAIN CHANGE INDICATOR BIT
CD - COMPOSITE DATA - 1's COMPLEMENT
TD - TRACE DATA - 1's COMPLEMENT
Z - END GAIN SCAN
P - ODD PARITY OF TRACKS 1 THRU 16
   18 THRU 28

Fig-4

A. J. MALLETT
JERRELL F. MOFFITT
INVENTORS.

BY
Michael P. Breston
ATTORNEY

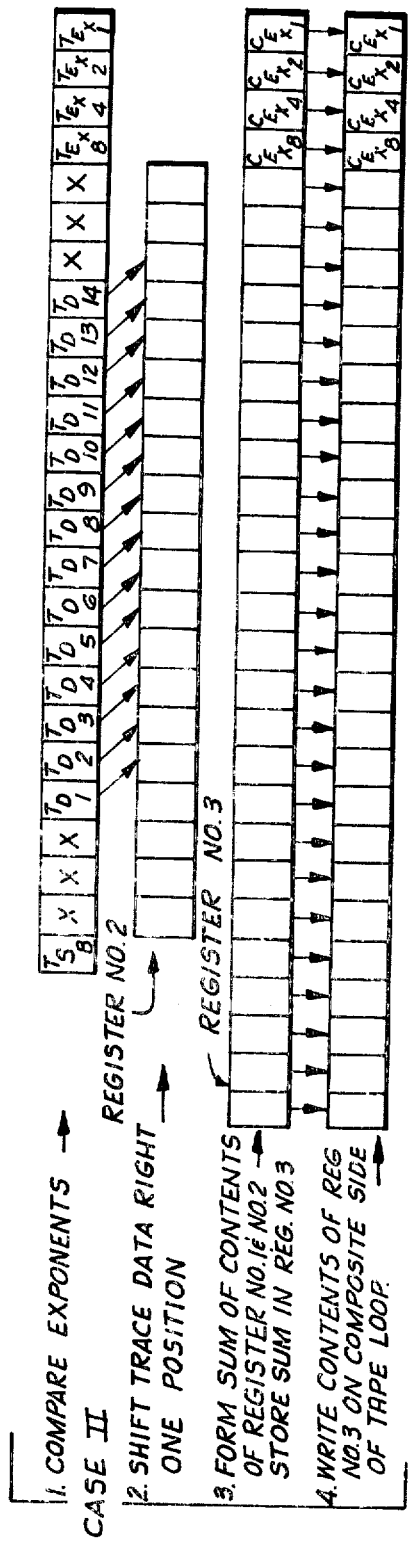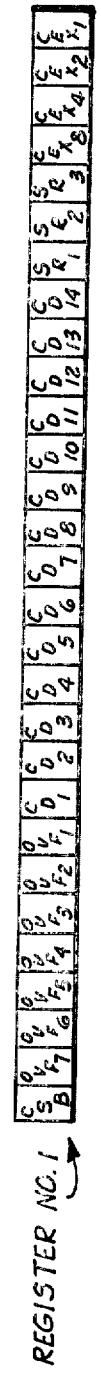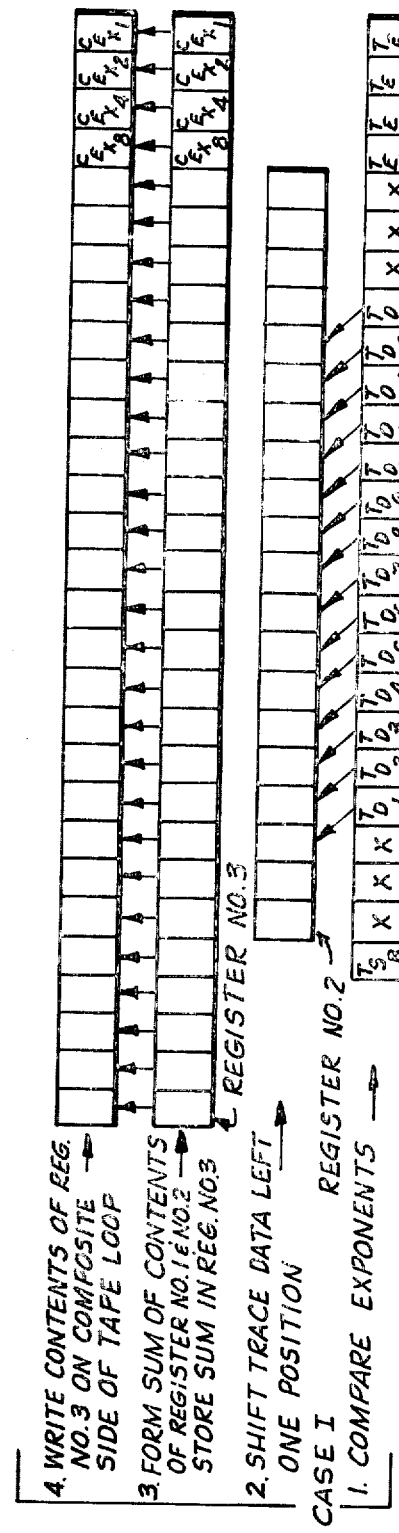
FIG. 5A NORMALIZATION AND SUMMATION PROCESS
A. J. MALLETT
JERRELL F. MOFFITT
INVENTORS.
BY
Michael P. Breston
ATTORNEY

DIGITAL FIELD COMPOSITING SYSTEM

BACKGROUND OF THE INVENTION

In carrying out seismic exploration, seismic signals or pressure waves are introduced by land or marine energy sources such as gas exploders, vibrators, explosive charges, etc. The location wherein the pressure waves are introduced is known as the shot point. Suitable transducers such as geophones or hydrophones act as velocity or pressure sensitive detectors, usually arranged in arrays at the surface of the earth or in streamer cables for offshore operation. These transducers convert the reflected seismic signals into correspondingly varying electric signals. The transducers will naturally respond to any waves, i.e., motions or pressures detected. The seismic signals of interest, however, in a reflection seismic system are only those which are reflected from an interface or boundary between different layers of the geological structure of interest. As is well known, the seismic signals of interest which are converted into electric signals are very often obscured by interferring electric signals not at all related to the seismic electric signals. These undesired electric signals are caused by disturbances such as noise from within the earth itself, atmospheric conditions, surface conditions, etc. Reflection seismic systems are only possible because various techniques have been devised for emphasizing or correlating the electric signals of interest corresponding to reflections and de-emphasizing or totally suppressing undesired noise or interference electric signals.

A well-known technique for correlating the reflection electric signals from several shot points is to composite the traces obtained from these shots. A trace may be a graphical curve, an analog electric signal, a corresponding digital word, etc. In this invention, traces prior to being composited are represented by digital words. It is hoped of course that the reflection signals from each detector station in the array which are repeated will be emphasized and the interference signals will be de-emphasized or totally suppressed. Ordinarily the composition or mixing of seismic records was carried out in a centrally located data processing center, not in the field, with the aid of very expensive to operate digital computers. Field digital compositing is greatly desirable because it is much less expensive and at the same time provides the seismic field exploration crew with information needed in the field to best orient the seismic exploration effort.

The seismic system which is becoming most widely used in recent years is known as the binary-gain ranging system. Such a system is described, for example, in U.S. Pat. No. 3,315,223 issued on Apr. 18, 1967 to H. C. Hibbard, et al. This system records a plurality of detected electric seismic signals in digital form, and includes a plurality of variable gain amplifiers each amplifier being connected to a detector station. The gain of each amplifier is variable by fixed steps, whereby each step represents a change in gain of two to a given power.

The forms for recording the output digital signals from binary gain ranging systems has now been standardized and are known as SEG Formats A and B, described in several publications and patents.

In general, a binary gain ranging system shifts automatically from a low-signal magnitude, high-gain range to a higher signal magnitude, low-gain range, as the signal magnitude increases, and it performs the reverse operation as the signal magnitude decreases. Such a procedure can be essentially instantaneous in both directions. The operation can take place between samplings of the signal and before the binary digits are recorded. Thus, in a binary-gain-ranging system each sample of an analog electric signal from each variable gain amplifier (or other source) can be represented in digital form by binary digits or bits, arranged in words, on one hand indicative of the sign and the magnitude of the signal at the output of the amplifier, and on the other hand the gain of the amplifier at the time of the sample, the relation of the sample to previous samples and other information useful in the conversion of the analog information to digital form and back into analog form. It is important for this invention to remember that each sample from each variable gain amplifier is represented in a digital system by at least a binary word indicative of its amplitude at the amplifier output (hereinafter called A-word), and a binary number indicative of the gain of the amplifier at the time the sample was processed through the amplifier (hereinafter called G-word). It will be understood that "amplitude" includes both "magnitude" and "sign" of the sample. A "T-word" (or trace-word) hereinafter will mean an A-word and its corresponding G-word.

Broadly, the invention comprises a method of processing a plurality of signals in which correlative reflected data is composited and distinguished from non-correlative data in the respective signals. The method includes the steps of selecting a reference (typically the first) $A_1$-word and its $G_1$-word, then normalizing all subsequent $A_2$, $A_3$–$A_n$-words so that their corresponding $G_2$, $G_3$–$G_n$-words become equal to the reference $G_1$-word. Thereafter, the normalized A-words are added and their composite is stored or reproduced in analog or visual form.

The method also includes the steps of recording on an endless tape loop, divided into a "Composite" file and a "Trace" file, the composite word or data and the immediately preceding T-word. By having two separate recording files on the tape, defective traces caused by misfiring or other causes can be selectively deleted before they become composited.

In the system of this invention, the first $T_1$-word (i.e., the $A_1$-word and the $G_1$-word) is written in the Composite file and the Trace file is forced to a zero data value. For all cycles after the first (or reference) cycle, the Trace data is written in the Trace file. The second $T_2$-word is written in the Trace file and simultaneously the first $T_1$-word is written in the Composite file in space alignment. The $T_2$-word is normalized to the $T_1$-word and the composite ($T_1 + T_2$) is recorded in the Composite file while the third $T_3$-word is recorded in the Trace file, etc.

SUMMARY OF THE INVENTION

The method and apparatus of this invention allow the compositing and recording of seismic data in the field in such a manner that indications of the raw data are recorded including amplitude and gain information. In each compositing step the amplitude is normalized in accordance with prior gain information so that before the new seismic data is added to the prior seismic data their respective gains are suitably correlated or made equal. An advantage of this invention is that new data, before being summed with previous data, is available for visual display and inspection or other monitoring.

The foregoing and other objects and benefits of the invention are described in greater detail and are illustrated in the following drawings, in which:

FIG. 1 is a block diagram of a binary-gain ranging compositing system illustrating the broad aspects of this invention;

FIG. 2 is a schematic representation of the endless loop tape shown in FIG. 1 illustrating the manner of recording seismic data and composited data on the tape in FIG. 1;

FIG. 3 is a more detailed block diagram of a preferred embodiment of the binary-gain-ranging digital compositing system in accordance with this invention;

FIG. 4 is a preferred format used in the system of FIG. 3;

FIG. 5A illustrates the steps carried out by the normalization and summation process.

Figure 5B:
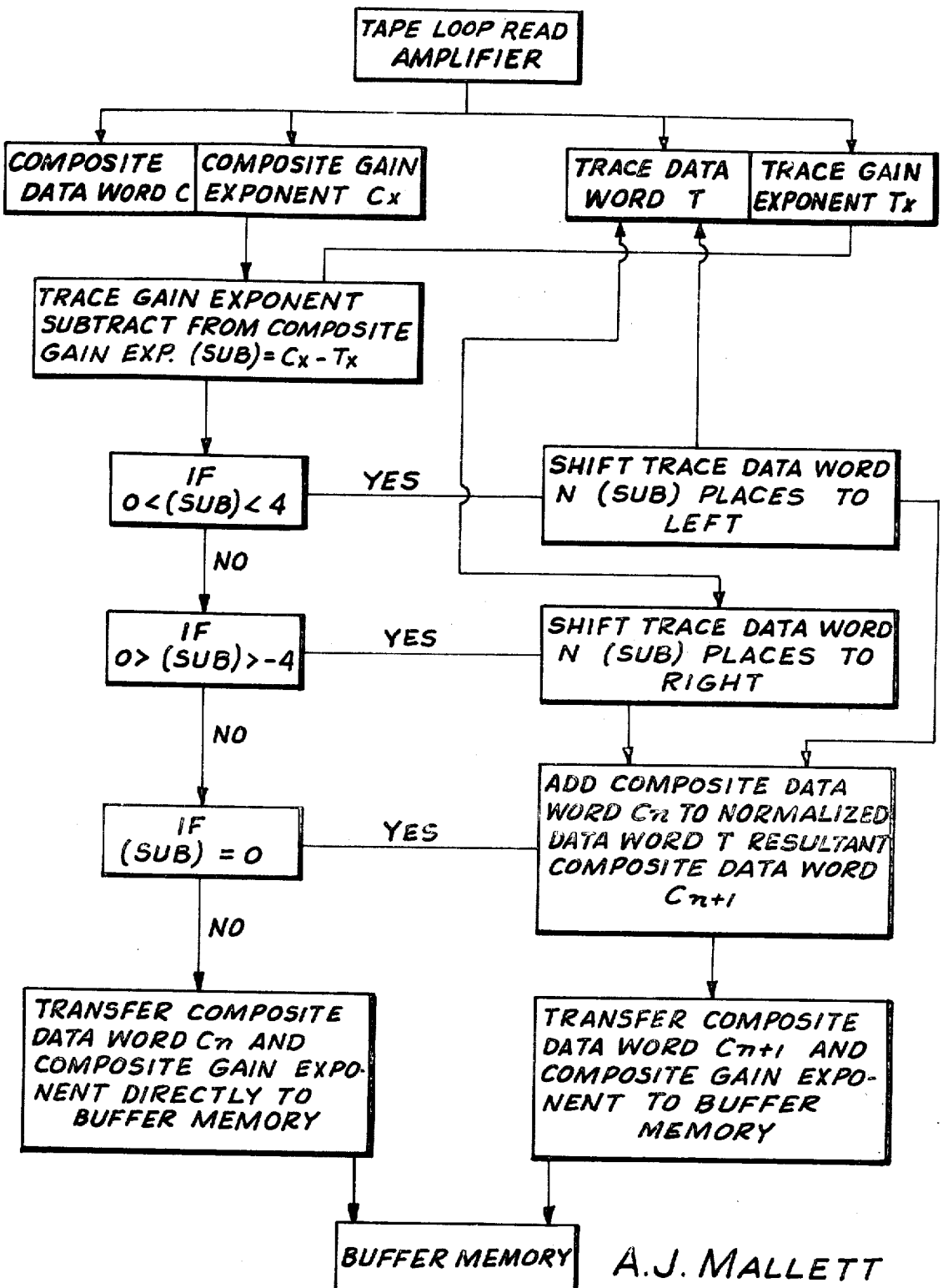
FIG. 5B is a chart-flow diagram of the steps in the operation of the trace normalizer and shift registers.

Referring now more specifically to FIG. 1, there is shown a seismic, binary-gain-ranging system 10. Such binary gain ranging systems are commercially available, as for example from Geo Space Corporation, Houston, Tex., Model 1590, and from others. The function of such a system is to receive seismic signals, usually recorded on reproducible records, digitize and record them in digital form in standard formats. Ultimately the records from the digitally recorded format are reconverted back into analog form to provide a seismic record section of the geological area under exploration.

A seismic gain ranging system may include many channels typically 24, 36 or 48. Each channel processes information received from a single transducer or a plurality of transducers arranged in a sub-array. The sub-arrays are suitably positioned in a patterned array to cover the area under investigation. The arrays are then moved discretely or continuously to other locations as the seismic exploration proceeds. Each shot point produces on the digital tape, in the seismic binary gain ranging system, a record which includes a plurality of traces represented by a plurality of digital words, each word representing the amplitude of the sample signal at the output of the binary gain ranging amplifier. For the amplitude of the sample to be fully determined, the gain of the amplifier at the time the sample was processed through the amplifier is also recorded. To simplify the understanding of the operation of the present invention it will be assumed, for the sake of simplicity, that each shot point produces a single amplitude word and a single gain word, i.e., an A-word and a G-word, or in still shorter notation a T-word. In actual practice, of course, there are many T-words from each channel, and the record for each shot includes a plurality of channels. It will also be understood that in addition to the signal trace or T-words a digital seismic record includes many other words useful and necessary to program the seismic information through computer systems, for example, synchronizing words, clock words, index words, etc.

Referring now to FIGS. 1 and 2, the seismic binary gain ranging system 10 supplies its output A and G words, as well as other words, on lines 12, 14 and 15, respectively, to a suitable word select gate system 16 which properly programs the words for subsequent recording. The system 16, in addition to receiving the output from the seismic, binary-gain-ranging system 10, also receives the output digital numbers representing the composite words, or C-words, from a digital computer 30, which includes a memory section 32. System 16 suitably times and programs the various words and feeds them to a write amplifier 8 for recording by a magnetic recording or write-head 20 on an endless tape 22 rotating as shown in the direction of the arrow 24. The information recorded on the tape 22 is read out by a magnetic read head 26 and fed to a read amplifier 28 and then into the digital computer 30. A suitable clock 40 times the various elements of the compositing system.

An understanding of the manner of recording on the tape 22 can be had if one visualizes a symmetrical plane X—X and if one looks at the tape in stretched out form, as if it were moving in a linear direction from right to left. For the sake of simplicity each record, even though normally including many words, will be represented only by a single T-word.

Write and read heads 20, 26 respectively, are positioned on either side of the X—X plane. The width of the tape 22 is divided into an upper portion 42, or composite file, and into a lower portion 44, or trace file. Write head 20 can record simultaneously across the entire width of the tape both the composite and trace words. Similarly, read head 26 can read out the entire information across the tape 22.

At the start, reference, or first cycle, write head 20 records in the composite file the entire first record, represented for simplicity as previously mentioned by a single $T_1$-word. The remaining tape is clear, and if not clear it is forced to have a zero value. As the recorded information passes in front of the read head 26, it reads out the $T_1$ word and forwards it to the computer 30 via the read amplifier 28. The first composite $C_1$-word, which results from summation of $T_1$ with zero, is $T_1$ which is applied to line 34 and into the word select gate system 16.

At the second cycle, a $T_2$-word is fed to the word select gate system 16 which now contains both the $T_2$ and the $T_1$ words. The word select gate system 16 properly aligns and applies them to the write amplifier 18 which causes write head 20 to record the composite $C_1$-word in the composite file and the trace $T_2$-word in the trace file on the left-hand side of the X—X plane. When the tape comes again in front of the read head 26, both the composite and the trace words are read out and fed into the digital computer 30, which normalizes $T_2$ with the trace word $T_1$ and then adds the two to obtain a new composite $C_2$ word. The $C_2$ word is again applied to line 34 and into the word select gate system 16.

At the third cycle, the seismic binary gain ranging system 10 provides a third trace $T_3$ word into the system 16 which now contains both $T_3$ and $C_2$ words. System 16 applies $T_3$ and $C_2$ words into write amplifier 18 and then to head 20 for writing on the left-hand side of tape 22. $T_3$ is recorded in the trace file and $C_2$ in the composite file. Again the read-out head 26 read out both $T_3$ and $C_2$ and feeds them into the digital computer 30 which normalizes $T_3$ with the first trace word $T_1$ and adds the normalized $T_3$ to the last composite $C_2$ to provide $C_3$. The latter is again recorded simultaneously with the next arriving trace word $T_4$ on the left-hand side of tape 22 in the composite and trace files, respectively, as shown. The steps are repeated until the $n^{th}$ cycle.

Referring now to a preferred embodiment of the system of the present invention reference is made to FIG. 3 in which is shown a group of seismic detectors 50A–50D connected to a group of seismic amplifiers 51. One amplifier channel is provided for each detector. Each amplifier is of the binary-gain ranging type which maintains at its output an amplitude within a selected range while indicating on separate output lines the actual gain required to produce its output.

The seismic output signals of controlled amplitude range are then connected to a multiplexer 52 which scans them and drives an Analog-to-Digital converter 53. The output gain signals from the seismic amplifiers 51 are applied to the input data select gates 54. The output of the A-to-D converter 53 is also applied to the gates 54. The latter now contains both signal and gain data. The output of gates 54 is applied to loop-data-select gates 55 which drive a group of write amplifiers 56, which in turn feed their output signals to a write head 57 for recording the digital data in proper form on tape-loop 58. A read head 59 is connected to a group of read amplifiers 60, the outputs of which are applied to a trace normalizer 61. The latter drives a summing unit 62 which feeds its output to a memory 63. The output from memory 63 is applied to an output normalizer 64 and to the loop data select gates 55. The output of normalizer 64 is applied to the output-data-select gates 65, and then to a Digital-to-Analog converter 66 which makes available in analog form the composite information for suitable display or recording. A write control 68 programs the various gates for proper recording on the loop 58. In a like manner, the read control 69 programs the gates which control the read out information. The various gate control units, the multiplexer unit and the converter units are under the control of a central clock 67 which serves to synchronize related operations. The various blocks shown on the left side of the dotted line A-A represent a conventional seismic, binary-gain digital system as will be apparent to those skilled in the art, and includes a magnetic tape transport containing suitable amplifiers for recording data in digital form in a compatible format and capable of reading out the recorded information for subsequent processing.

In FIG. 4 is shown in more detail the arrangement of the format for carrying out the method of this invention. The group of boxes may be visualized as a section of the endless loop tape 58. Each box represents the location on the tape where either a binary ONE or ZERO is recorded. The diagram is read in the customary manner from left to right. The first sixteen tracks are reserved for recording composite data and associated information. The last eleven tracks are used for recording trace or input data and its associated information. In the two columns reserved for each channel the tracks of primary significance are: 6–7, 9–16, 18–19, and 21–28. For example, in the two columns reserved for channel 1 on tracks 6 and 7 are written the gain code for the composite seismic information corresponding to the composite seismic information written in the same two columns on tracks 9 to 16.

Likewise, in the same two columns reserved for channel 1, on tracks 18 and 19 are recorded the gain codes for the seismic information written on tracks 21–28. The gain code information is originally obtained from the binary-gain-ranging seismic amplifiers 51, while the trace or seismic information is obtained from the Analog-to-Digital converter 53. It is the trace gain code on tracks 18 and 19, in the two columns reserved for each channel, which is compared with the composite gain code information in tracks 6 and 7 in the same two columns. This comparison is carried out by the trace normalizer 61.

The trace normalizer 61 shown in FIG. 3 contains a plurality of shift registers. The operation of shift registers is well known in the digital art and is best understood graphically from the illustration shown in FIG. 5A.

Register No. 1 contains the sum of all previously composited data to which new data is to be added. The trace normalizer 61, by command from the read-control unit 69, performs one of two possible operations: in case II the trace normalizer 61 reads the trace exponent TEX8-TEX1 shown in the right-hand end on line 1 and compares these exponents with the composite exponents CEX8-CEX1 shown in the right-hand end of register No. 1. The result of this comparison provides a shift signal. Since it is assumed that the trace exponent is greater by 1 than the composite exponent, the trace data is shifted to the right by one position. After shifting the trace data to the right, it is then summed with the composite data in register No. 1. The result of this summation or composite is stored in register No. 3. The output from register No. 3 is suitably fed as previously explained to the write head 57 for recording in the composite file on the tape loop 58.

The operation of the trace normalizer 61 for case I is in all respects similar to that of case II except that now the data is shifted to the left by one position instead of to the right by one position, since in case I the trace data exponent has a magnitude one less than the composite data exponent.

In FIG. 5B is shown in chart-flow diagram a more detailed explanation of the operation of the trace normalizer and shift registers in the preferred embodiment of the invention. As will be seen from FIG. 5B, if the magnitude of the difference between the trace exponent and the composite exponent is equal to or greater than 4, then the readout trace word is not added to the composite sum, and the composite data word Cn together with the composite gain exponent are transferred directly to the buffer memory. For all cases wherein the magnitude of the difference between the trace exponent and the composite exponent is less than 4, the readout trace data is normalized by shifting the exponent either to the left or to the right depending on the sign of this magnitude. The composite data word is then added to the normalized readout trace data word, and the resultant composite data word is transferred to the buffer memory. In this manner the effects of undesirable noise spikes or of other external interferences can be eliminated from the composite data.

In sum, the first reference record is written in the composite file and all subsequent trace data are normalized to the exponent or gain of the first trace. As a result the exponent remains the same throughout the entire compositing process. By normalizing, the gain words of the original record are retained so that the final composite record has the same gain word character as the first record. As a result, the composite record may be recorded in the same format as the individual trace records could have been recorded. Also, when the composite record is reconverted back to analog form and displayed for viewing, the composite data will have the same gain word character as the individual trace record. Consequently, interpretation of the displayed section is greatly facilitated thereby.

Moreover by having two separate files on the tape, defective data caused, for example, by misfiring can be deleted before it is added to the composite data. The trace normalizer compares the trace and composite exponents and suitably shifts the trace data in order to make the exponents equal before summation. The shift range of the registers is three bits either to the right or left. The summing unit generates the sum of the normalized trace and of the composite data. The output of the summing unit 62 is broken into two 15-bit bytes for entry into the memory 63. The latter performs at least two important functions: it compensates for the distance between the read and write heads, and it buffers time errors due to tape speed variations.

The above and other advantages inherent in the method and system above described will become apparent to those skilled in the art. Even though the invention has been described with a great amount of detail, various modifications will become readily apparent to those skilled in the art and consequently the invention is best defined by the scope of the appended claims.

We claim:

1. In a method for digitally compositing seismic data derived from a plurality of analog channels, each channel containing a binary-gain-ranging amplifier for amplifying the individual trace data in each channel, the trace data including (a) an indication of the amplitude of the trace data at the output of said amplifier and (b) an exponent corresponding to the gain of the amplifier for said amplitude indication, the steps of:

providing a plurality of recording tracks on a continuous-loop movable magnetic tape;

grouping a number of said tracks to form a composite data file for periodically recording thereon composited data including (a) an indication of the amplitude of the composited data and (b) an initial exponent corresponding to an initial gain value of the trace data;

grouping another number of said tracks to form a trace data file for periodically recording thereon the output trace data from said analog channel;

periodically and simultaneously reading out from said tape both said recorded composited data and said trace data;

determining the magnitude of the difference between the readout trace gain exponent and said initial exponent;

normalizing said readout trace data so that the gain exponent of said readout trace data corresponds to said initial exponent, only when said magnitude is within predetermined acceptable limits;

combining the normalized trace data with the readout composited data to form new composited data; and recording said new composited data in said composite file on said tape.

2. In a system for digitally compositing seismic data derived from a plurality of analog channels, each channel containing a binary-gain-ranging amplifier for amplifying the individual trace data in each channel, the trace data including (a) an indication of the amplitude of the trace data at the output of said amplifier and (b) an exponent corresponding to the gain of the amplifier for said amplitude indication, comprising:

a movable, continuous-loop, magnetic tape defining a plurality of recording tracks, a number of tracks being arranged to form a composite data file for periodically recording composited data thereon including (a) an indication of the amplitude of the composited data and (b) an initial exponent corresponding to an initial gain value of the trace data;

another number of tracks being arranged to form a trace data file for periodically recording thereon the output trace data from said analog channels;

readout means for periodically and simultaneously reading out from said tape both said recorded composited data and said trace data;

means for determining the magnitude of the difference between the readout trace gain exponent and said initial exponent;

normalizing means coupled to said readout means and adapted to normalize said readout trace data so that the exponent of said readout trace data corresponds to said initial exponent, only when said magnitude is within predetermined acceptable limits;

combining means coupled to said normalizing means for combining the normalized trace data with the readout composited data to form new composited data; and recording means coupled to said combining means for recording said new composited data in said composite file on said tape.

* * * * *